Jan. 19, 1937.  R. E. KELLER  2,068,142
AUTOMATIC TRANSMISSION
Filed Feb. 26, 1934  3 Sheets-Sheet 2
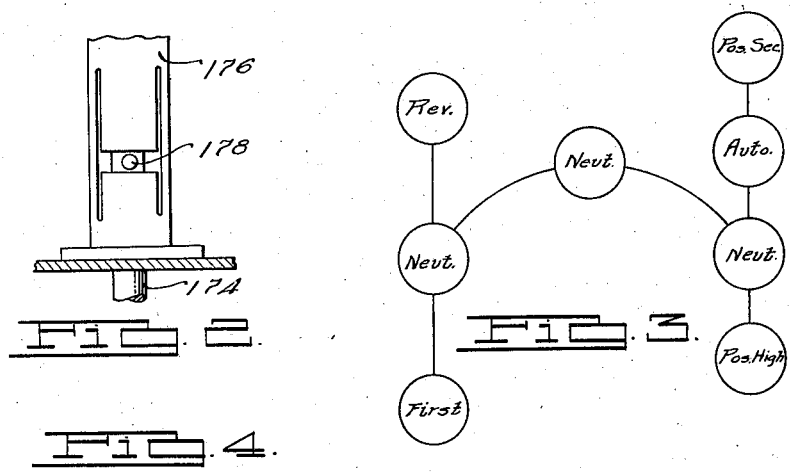
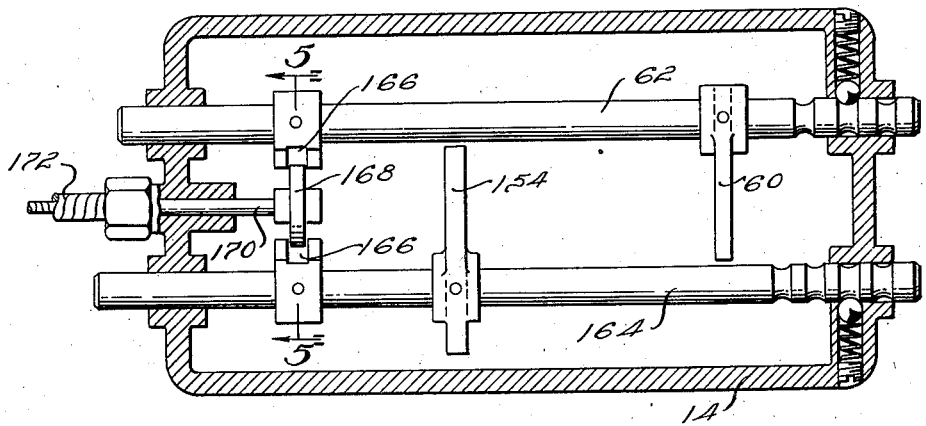
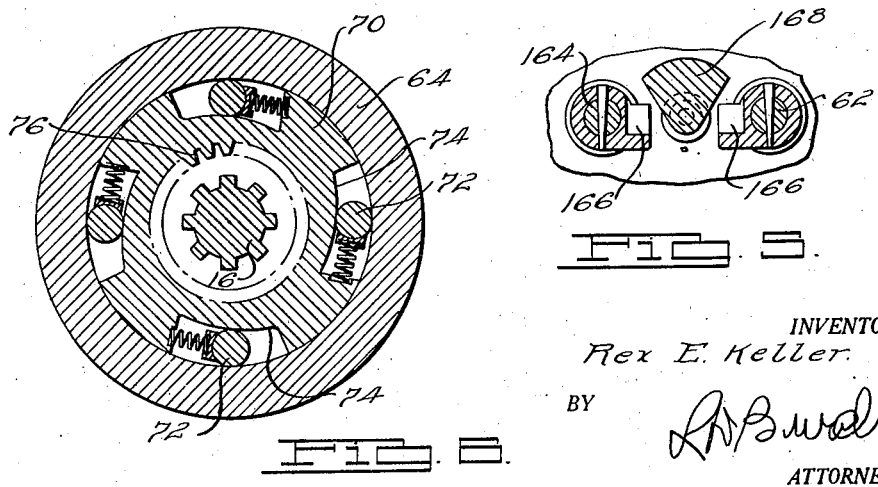
INVENTOR.
Rex E. Keller.
BY
ATTORNEY.

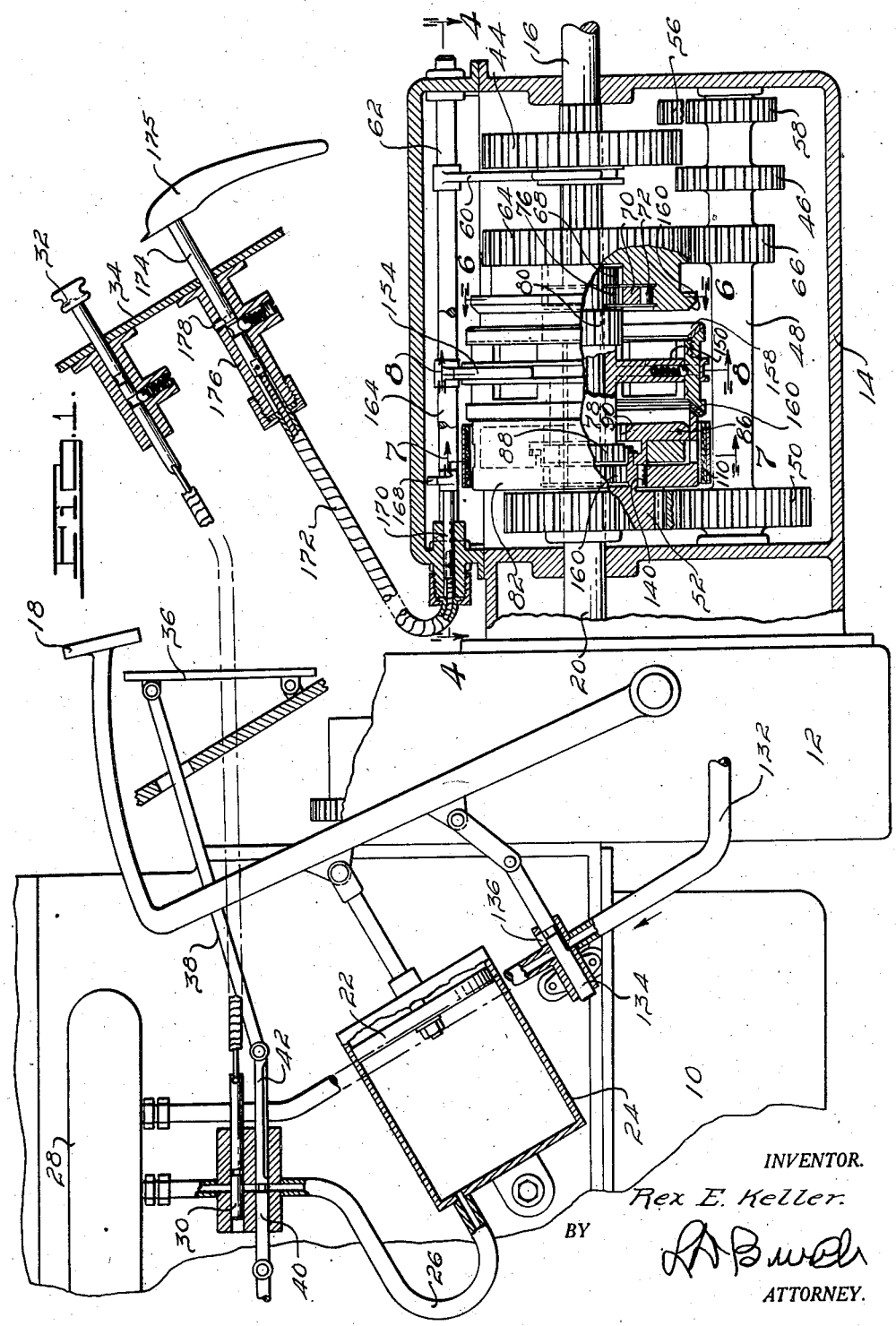

Jan. 19, 1937.   R. E. KELLER   2,068,142
AUTOMATIC TRANSMISSION
Filed Feb. 26, 1934   3 Sheets-Sheet 3
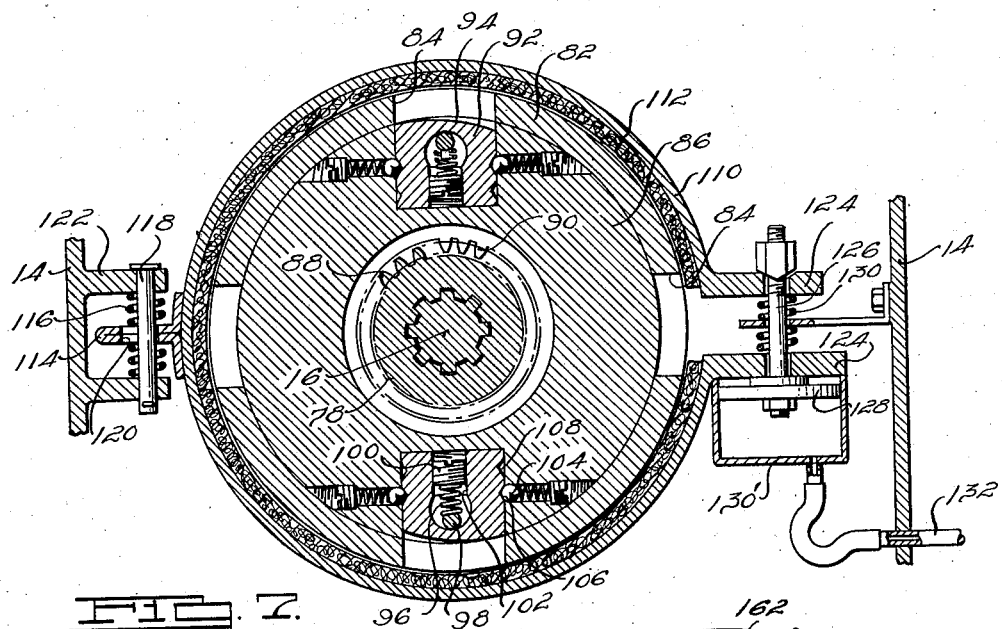
FIG. 7.
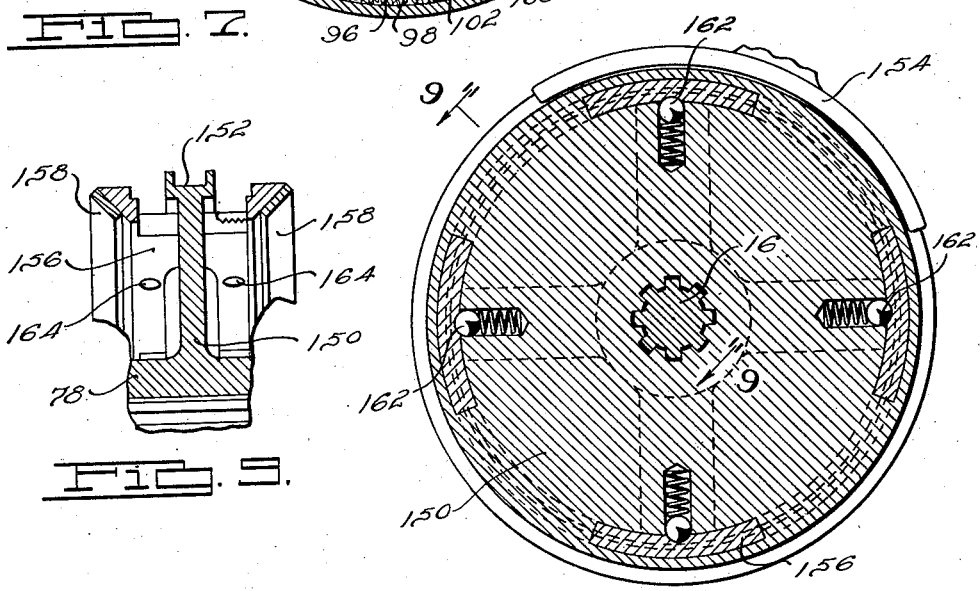
FIG. 9.
FIG. 8.
INVENTOR.
Rex E. Keller.
BY
ATTORNEY.

Patented Jan. 19, 1937

2,068,142

UNITED STATES PATENT OFFICE 2,068,142

AUTOMATIC TRANSMISSION

Rex E. Keller, Beverly Hills, Calif.

Application February 26, 1934, Serial No. 713,029

12 Claims. (Cl. 192—.01)

This invention relates to automatic transmissions and has particular reference to manual controlling mechanism whereby the operator of a vehicle may selectively effect changes in the gear ratio at such time as the same may appear desirable.

The invention contemplates the provision of a variable speed power transmitting mechanism including automatic means for effecting changes in the gear ratio responsive to certain conditions of operation of the vehicle, manually operable means for effecting selective changes in the gear ratio of the transmission without regard to the condition of the automatic means, an automatically operated clutch disposed in the driving connection between the engine of a vehicle and the transmission, and means associated with said clutch and with the automatic speed changing mechanism and operable incidental to the operation of said clutch either automatically or manually for expediting the changing of the gear ratio.

For purposes of illustration, there is disclosed in the accompanying drawings a transmission mechanism of an automotive vehicle and embodying an automatic speed changing mechanism for effecting changes in the gear ratio of the transmission responsive to certain conditions of operation thereof, a positive clutch element for effecting selective changes in the gear ratio and which, in effect, lock out the automatic speed changing mechanism, synchronizing means associated with said positive clutch element, a manual control mounted upon the dashboard of the vehicle and operable for shifting said positive clutch element to effect selective changes in the gear ratio, a vacuum-operated main clutch for disconnecting the transmission mechanism from the engine when the throttle controlling the speed thereof is closed, and a synchronizing brake for the automatic speed changing mechanism and operated in timed relationship to said main clutch for improving the performance of the automatic speed changing mechanism.

A principal object of the invention is to provide a transmission in which changes in the gear ratio are effected automatically and responsive to certain conditions of operation of the transmission, which conditions may be brought about incidental to controlling the operation of the vehicle by means of the throttle controlling the speed of the engine.

Another object of the invention is to provide a transmission including automatic speed changing mechanism in which the same may be controlled to effect an extremely rapid change in the gear ratio for obtaining a rapid acceleration of the vehicle in high gear.

Another object of the invention is to provide a transmission which provides automatic speed changing, selective speed changing, synchronization of the clutch elements used in effecting selective changes in the gear ratio, an automatic main clutch, and an engine throttle control associated therewith which enables the operator of the vehicle to drive the same under normal conditions without operating any more than the engine control throttle and the brake pedal for effecting an application of the brakes of the vehicle.

Other objects and advantages will be apparent from the following specification taken in conjunction with the accompanying drawings, of which there are three sheets and in which:

Fig. 1 is a side elevational view, partly in section, of a transmission and associated control apparatus and embracing my invention;

Fig. 2 is an enlarged view of a portion of the dash control;

Fig. 3 is a diagrammatic view of the handle position of the dash-mounted transmission control having reference to the portion thereof illustrated in Fig. 2;

Fig. 4 is a view taken in a plane on the line 4—4 of Fig. 1 and illustrating the shifter rod mechanism of the transmission;

Fig. 5 is a cross sectional view taken in the plane on the line 5—5 of Fig. 4;

Fig. 6 is a vertical cross sectional view of the overrunning clutch and taken in the plane on the line 6—6 of Fig. 1;

Fig. 7 is a vertical cross sectional view taken in a plane on the line 7—7 of Fig. 1 and illustrating certain details of the automatic speed changing mechanism;

Fig. 8 is a cross sectional view taken in a plane on the line 8—8 of Fig. 1 and illustrating certain details of the synchronizing clutch; and Fig. 9 is a sectional view taken in the plane on the line 9—9 of Fig. 8 illustrating further details of the synchronizing clutch.

Having reference now to Fig. 1 of the drawings, there is diagrammatically shown at 10 an engine which is adapted to be connected by a main clutch 12 and a transmission mechanism 14 to the propeller shaft 16 which is operatively connected to the road wheels of the vehicle for driving the same. A foot pedal 18, adapted to be operated by the driver of the vehicle, is provided for operating the main clutch 12 for disconnecting the driving shaft 20 of the transmission 14 from the engine. Clutch pedal 18 is operatively connected to a piston 22 which is disposed within a vacuum cylinder 24 and adapted to reciprocate therein responsive to changes in vacuum for operating the clutch 12 to disengage the engine 10 from the driving shaft 20 of the transmission.

Vacuum cylinder 24 is in communication by means of a conduit 26 with a suitable source of vacuum such as the intake manifold 28 of the engine 10. The application of vacuum to the cylinder 24 through the conduit 26 is controlled by a manually operative valve 30 which is adapted to be operated by a push button 32 mounted upon the dashboard 34 of the vehicle, for the purpose of cutting off the supply of vacuum to the cylinder 24, in which event the main clutch 12 will have to be operated by manipulation of the clutch pedal 18.

While the valve 30 is shown in Fig. 1 of the drawings in such a position as to lock out vacuum operation of the clutch 12, normally the valve 30 is set in such a position as to permit the application of vacuum to the vacuum cylinder 24. The engine 10 is provided with a foot-operated throttle control 36, mounted on the floor in the driver's compartment of the vehicle and which is adapted to be operatively connected by a linkage 38 to the carburetor (not shown). A portion of the linkage 38 is formed to provide a valve element 40 which, like valve 30, is disposed in the vacuum conduit 26 and adapted to control the application of vacuum to the cylinder 24. The valve element 40, as shown in Fig. 1, is in position to put the vacuum cylinder 24 in communication with the intake manifold 28 and is provided with a channel portion 42 which is adapted to place the vacuum cylinder in communication with atmosphere when the throttle control 36 is depressed for accelerating the speed of the engine. In the positions in which the parts are shown in Fig. 1 of the drawings, the throttle control 36 is positioned so as to permit application of vacuum to the vacuum cylinder 24. Should the valve 30 be moved to a position other than that in which it is shown in Fig. 1 of the drawings, the application of vacuum to the cylinder 24 would move piston 22 within said cylinder to depress the clutch pedal 18, thereby to disconnect the engine 10 from the driving shaft 20. This will normally be the condition when the engine is idling. Manipulation of the throttle control 36 to open the engine throttle will reduce the vacuum within the manifold 28 as well as to connect cylinder 24 to atmosphere through valve 42, in which event the clutch pedal 18 will be returned to the position in which it is shown in Fig. 1 by the return springs of clutch 12 and in which event the engine 10 will be operatively connected to the driving shaft 20. It will be apparent that every time the throttle control 36 is closed, the vacuum 28 within the intake manifold will be sufficient to depress the clutch pedal 18 by acting on the piston 22, whereby the main clutch 12 will be disengaged every time the throttle control 36 is returned to its closed position.

The propeller or driven shaft 16 at its forward end is journaled in the rearward end of the driving shaft 20 and is provided with a gear 44 slidably splined thereto, which is adapted to mate with a spur gear 46 on a countershaft cluster of gears 48, gear 50 of which is in constant mesh with a gear 52 fixed to rotate with the driving shaft 20 for the purpose of providing a two-way or positive driving connection between the driving and driven shafts and through the intermediary of gears 52, 50, 46 and 44. Gear 44 is adapted to be moved to the right, looking at Fig. 1, to mate with an idler gear 56 which is in constant mesh with gear 58 of the countershaft gear cluster to provide a reverse driving connection between the driving and the driven shafts. A yoke 60, carried by a shifter rod 62, is provided for moving the gear 44 to select either a low or a reverse driving connection between the driving and the driven shafts.

A gear 64, freely running on the driven shaft 16 and constantly meshing with gear 66 of the countershaft gear cluster, is provided with an internal set of teeth 68 and is adapted to support a driven element 70 of a free wheeling or overrunning clutch, the driving element of which is provided by the body of the gear 64. Reference may be had to Fig. 6 where a vertical cross sectional view of the overrunning clutch is shown and in which a plurality of spring-pressed rollers 72 are disposed in a series of eccentric grooves 74, annularly spaced about the periphery of the driven element 70, which internally is provided with a set of teeth 76. The overrunning clutch is of well known construction and is adapted to provide a one-way or free wheeling driving connection between the gear 64 and the driven shaft 16, which is adapted to be connected to the driven element 70 by means of a slidable sleeve 78 which is splined to the driven shaft 16 and at one end is provided with an external set of teeth 80 adapted to be progressively mated with teeth 76 of the driven element 70 of the free wheeling clutch and with teeth 68 internally provided on the body of the gear 64. When the sleeve 78 has been shifted to its extreme righthand position, looking at Fig. 1, to mate teeth 80 with teeth 68, a two-way or positive driving connection will be provided between the driving and the driven shafts.

Gear 52 on the driving shaft is adapted to form the driving element of an overrunning clutch similar to that shown in Fig. 6, the driven element 82 of which is in the form of a drum or shell and is provided with a plurality of peripheral slotted openings 84. A cross sectional view of the overrunning clutch 52—148—82, looking toward the left in Fig. 1, corresponds exactly with the view 6—6 of the overrunning clutch 70—72—64 illustrated in Fig. 6. Nested within the drum-shaped element 82 is a core 86, which forms the driven element of a centrifugal clutch and which is adapted to be connected to the driven shaft 16 when sleeve 78 is shifted to the right to mate teeth 80 thereof with teeth 76 of the driven element of the free wheeling clutch. For this purpose, the opposite end of the sleeve 78 is provided with an external set of teeth 88 which are adapted to mate with an internal set of teeth 90 provided on the core or driven member 86 when said sleeve 78 is shifted to the right, looking at Fig. 1, to its first position. Movement of sleeve 78 to its extreme righthand position, looking at Fig. 1, to mate teeth 80 with teeth 68 to provide a positive or two-way driving connection between gear 64 and the driven shaft is adapted to move teeth 88 to the right of teeth 90 and out of mesh therewith so that at such time the driven or core member 86 of the centrifugal clutch is not connected to the driven shaft 16.

It will be apparent, however, that when the driven shaft 16 is connected through the free wheeling clutch to gear 64, that the driven element 86 of the centrifugal clutch will be rotating at a lower rate of speed than that of the driving or drum-shaped clutch member 82, since the same will be rotating directly with the driving shaft 20.

The driven member 86 of the centrifugal clutch is provided with one or more radially movable bolts 92 which are disposed in suitable recesses within the body member of the core 86 and which are adapted to be projected outwardly under the influence of centrifugal force to extend within the slotted openings 84 and engage the driving member 82 whereby the driving and driven members of the centrifugal clutch will be locked for rotation together. Each of the bolts 92 are provided with a cammed or beveled face 94 which is operable for preventing the movement of the bolts 92 into a slotted opening 84 until the rotative speeds of the driving member 82 and driven member 86 are approximately synchronous. During such time as the shaft 16 is driven through the gear train 50—66—64, the drum 82 will rotate at a faster rate (in a counter-clockwise direction looking at Fig. 7) than the core 86 as the drum 82 is driven directly and at the same rate as the driving shaft 20. While the centrifugal force of the bolt 92 tends to move the same outwardly, the cam face 94 will cause the bolt 92 to miss or jump the recesses 84 in the drum 82. This is due primarily to the fact that the leading edge of the bolt 92 (referring to the clockwise direction of the bolt) is recessed with respect to the trailing edge. Before the leading edge of the bolt 92 can travel radially sufficient to project into the recess 84, after the trailing edge moves out of contact with the inner surface of the drum ahead of the recess 84, the recess 84 will move out of alignment with the bolt 92 due to the difference in the speed of rotation of the member 86 and the member 82. Outward movement of the bolts 92 is resisted by a spring 96 confined between a pin 98 carried by the driven member 86 and an adjustable plug 100 threadedly secured in a bore 102 within the bolt in which the spring 96 is disposed and by spring-pressed poppets 104 carried by the core or driven member 86 and engaging in a notch 106 provided in the side of the bolt 92. The bolt 92 may be provided with a second notch 108 adapted to be engaged by the spring-pressed poppet 104 when the bolt 92 is in its outer position, whereby the spring-pressed poppet 104 will resist inward movement of the bolt 92 under the action of spring 96. It will be appreciated that each of the bolts 92 may be provided with a plurality of spring-pressed poppets 104 and notches 106 and 108 for controlling the action thereof. The tension of the spring 96, as well as the force with which the poppets 104 bear against the sides of the bolt 92, will determine the rotative speed of the core or driven member 86 at which the bolts 92 tend to move outwardly to engage in the slotted openings 84. It will also be appreciated that even after the driven member 86 has attained sufficient speed to move the bolts 92 outwardly, the same cannot be projected into the slotted openings 84 unless the speed of the driving member 82 is synchronized with that of the driven member 86, which may be accomplished by a momentary closing of the engine throttle 36.

When the driven shaft 16 is being driven through the free wheeling clutch associated with the gear 64, the driven clutch 86, which at such time will be operatively connected to the driven shaft 16, will be free to rotate at a rate in excess of that of the gear 64 so that if the throttle control 36 momentarily is closed to reduce the speed of the engine, the rotative speed of the driving clutch element 82 will decelerate until it reaches that of the driven clutch element 86, at which time the bolts 92 will be projected outwardly, assuming that the rotative speed of the driven clutch element is sufficient to cause the bolts 92 to fly outwardly.

For the purpose of quickly bringing the speed of the driving clutch element 82 down to that of the driven clutch element 86, a clutch brake may be provided which will be operated incidental to the closing of the throttle control 36. This clutch brake may consist of a brake band 110 disposed about the driving clutch element 82 and having a strip of suitable friction material 112 for gripping contact with the outer cylindrical surface of the driving member 82. The brake band 110 is provided with a flange 114 whereby the same may be supported by a pair of springs 116 and secured against displacement by a pin 118 extending through an aperture 120 in the flange 114 and supported by suitable lugs 122 provided internally on the transmission case 14. The ends of the brake band 110 are provided with flanged portions 124 through apertures in which a rod 126 of a vacuum-responsive piston 128 extends. Suitable springs 130 are disposed about the piston rod 126 and confined between the flanged ends 124 of the brake band 110 for normally holding the friction material 112 out of frictional engagement with the outer cylindrical surface of the driving clutch element 82.

Piston 128 is reciprocable within a vacuum cylinder 130′, which is adapted to be placed in communication with a suitable source of vacuum such as the intake manifold 28 by a conduit 132 controlled by a valve 134. Valve element 134 is operatively connected to clutch pedal 18 so that every time the same is depressed either manually or by the vacuum piston 22 to disengage the clutch 12, vacuum cylinder 130′ is for a short time interval placed in communication with the vacuum in the intake manifold, whereby the driving element 82 of the centrifugal clutch will be braked every time the main clutch 12 is disengaged. The valve element 134 in the conduit 132 is adapted to place vacuum cylinder 130′ in communication with atmosphere through vent 136, when the main clutch 12 is engaged, to release the driving clutch element 82 from frictional engagement with the brake band 110. When the clutch pedal 18 is actuated either automatically or manually to disengage the clutch 12 to permit a deceleration of the driving shaft 20, the piston 128 will be actuated to effect an application of the brake on the driving clutch element 82, at which time the speed of the engine 10 may optionally be reduced, depending upon the rate of acceleration desired in direct drive. At such time the driving clutch element 82 will overrun the driving shaft 20 on account of the free wheeling clutch rollers 140 which provide a one-way driving connection between gear 52 and the drum-shaped driving member 82. When the clutch brake is applied by the vacuum piston 128, it will not be acting against the rotation of the engine, since the same will have been disconnected from the driving shaft 20 by the release of the clutch 12, which release need be but momentary to permit the operation of the centrifugal clutch to effect an automatic change in the ratio of the driving connection between the driving and driven shafts.

The brake band 110 may be actuated to brake the driving clutch element 82 without reducing the speed of the engine by manipulation of the clutch pedal 18 to disengage the main clutch 12, in which event the valve element 134 would be moved to place the vacuum cylinder 130' in communication with the intake manifold, which would reduce the rotative speed of the driving clutch element 82 sufficiently to permit the outward movement of the bolts 92 into the slotted openings 84 to connect the driving and driven members of the centrifugal clutch, which, when the main clutch 12 is reengaged, will be operative for providing a direct driving connection between the driving and driven shafts. A change from a reduced to a direct driving connection either by manipulation of the clutch pedal 18 or by a temporary release of the engine throttle control 36 will be extremely rapid to permit the operator to accelerate at a high rate in direct drive, particularly if the throttle control 36 is depressed while the main clutch 12 is disengaged by manipulation of the clutch pedal 18. A manipulation of the clutch pedal 18 need not be any more than just sufficient to disengage the main clutch 12 momentarily.

The slidable sleeve 78 is provided with a disk portion 150, the annular surface of which is grooved as at 152 for receiving a yoke 154, whereby the sleeve 78 may be shifted to set the transmission for automatic operation or for effecting selective changes in the second and direct speed ranges. A sleeve 156 is carried by the disk 150 and slidable relative thereto and is provided on each end with a friction clutch cone 158 which are adapted to frictionally engage complementary cone surfaces 160 provided on the body member of the gear 64 and on the open end of the drum-shaped driving clutch member 82, so that when sleeve 78 is shifted axially for effecting positive or locked-up two-way driving connections between the gear 64, the gear 52 and the driven shaft, respectively, the friction clutch cones 158 will be moved into frictional engagement with the cone-shaped surfaces 160 for the purpose of synchronizing the rotative speeds of the teeth which are about to be intermeshed, in the event such teeth are rotating at different rates, as would be the case if the sleeve were moved from a position where the teeth 80 thereof were mating with teeth 68 of intermediate speed gear 64 to a position where teeth 88 would mate with teeth 60 internally provided on the gear 52 to effect a positive locked-up direct drive between the driving and the driven shafts.

The disk 150 carried by the slidable sleeve 78 is provided with a plurality of spring-pressed poppets 162, each of which is adapted to cooperate with a series of notches 164 internally provided on the sliding sleeve 156, so that after the cone-shaped surfaces 158 and 160 have been moved into frictional engagement with each other, the sleeve 78 may be shifted further in the same direction to mate the teeth on the sleeve 78 with the teeth on either the gear 52 or the teeth 68 on the intermediate speed gear 64.

For the purpose of shifting the sleeve 78, yoke 154 is affixed to a shifter rod 164, which, with shifter rod 62, are slidably mounted in the case of the transmission 14. Each of the shifter rods 62 and 164 is provided with a gate 166, which is adapted to be selectively engaged by a lug 168 secured to the end of a slidable shaft 170 which is connected to one end of a Bowden wire 172. The other end of the Bowden wire is operatively connected to a shaft 174 upon the outer end of which a handle 175 is provided and which is disposed within the driver's compartment of the vehicle. Shaft 174 may be mounted in a bearing 176 carried by the dashboard 34 of the vehicle and provided with a pin 178 movable in an H-shaped guideway cut into the bearing 176 for the purpose of permitting the handle 175 on the shaft 174 to be manipulated for selecting various gear ratios of the transmission. The handle 175 may be rotated about the axis of shaft 174 for moving the lug 168 into engagement with either of the gates 166, whereby the shifter rod to which such gate is connected may be moved for selecting the desired gear ratio.

Thus, rotation of the handle 175 in a clockwise direction and movement of the same forwardly to the first position will cause sleeve 78 to shift to the right, looking at Fig. 1, to mate teeth 88 thereof with teeth 90 of the driven member 86 of the centrifugal clutch and simultaneously to mate teeth 80 at the opposite end of the sleeve with the teeth 76 provided on the driven element 70 of the intermediate speed gear free wheeling clutch. In this position the rotation of the driven shaft 16 may be initiated, since the same will then be operatively connected to the gear 64, and when a sufficient speed of rotation of the driven shaft and driven clutch member 86 has been attained, an automatic change to a direct drive may be effected in the manner heretofore described.

When the driven shaft 16 is being driven through the gear train which includes the countershaft, the driven member 86 of the automatic clutch will be rotating at a lower rate of speed than that of the driving member 82 of the automatic clutch. If at such time the main clutch 12 is disengaged either automatically or manually, the valve 134, controlling the application of suction to the cylinder 130', will be actuated to place said cylinder 130' in communication with the intake manifold for a short time interval, as a result of which the piston 128 will be moved to apply the friction brake 110 to the drum of the driving member. Thus, while permitting the driven shaft to coast under the momentum of the vehicle, the driving member of the automatic clutch can be decelerated relative to that of the driven member, which at such time is connected to the driven shaft, so that the rotative speeds of said driving and driven members may be brought to an approximately synchronous speed, whereupon the bolt 92 will operate, providing, of course, that the core member 86 of the automatic clutch is rotating sufficiently rapidly to cause centrifugal force to move said bolt 92 outwardly and into the bolt-engaging recesses 84.

The brake band 110 is applied only for a short time interval incidental to disconnection of main clutch 12 either manually or automatically as valve element 134 is adapted to place conduit 132 in communication with the source of vacuum 28 only during a part of the clutch pedal travel; that is, at some time during the movement of the clutch pedal from engaged to disengaged position, which time preferably is immediately after the clutch 12 is disengaged, but prior to the end of the clutch pedal travel.

While one embodiment of the invention has been illustrated and described, it must be appreciated that many modifications may be made in the construction thereof without departing from the scope of the invention, and for that reason I do not desire to be limited to any particular form or arrangement except in so far 2,068,142 as such limitations are included in the following claims.

I claim:

1. In an engine-driven vehicle, the combination of a variable speed transmission having driving and driven shafts and an automatic speed changing mechanism including a centrifugally actuated clutch having driving and driven members operatively connected to said shafts respectively, means for providing an initial driving connection between said shafts for rotating said clutch members at different rates of speed, a locking member carried by one of said clutch members and operable responsive to centrifugal force resulting from rotation thereof for engagement with the other of said clutch members to provide a driving connection between said shafts at a different ratio than the said initial driving connection, and means associated with said locking member and operable upon substantial relative rotation between said clutch members for preventing the operation of said locking member until the rotative speeds of said clutch members are approximately synchronous, a main clutch operatively connecting said driving shaft to the engine of said vehicle, and brake means for braking the driving member of said centrifugally actuated clutch to expedite the synchronization of the same with said driven member and operable incidental to the actuation of said main clutch to break the driving connection between said driving shaft and the engine of the vehicle.

2. In a device of the class described, the combination of a change speed transmission having driving and driven shafts and a centrifugally actuated clutch including driving and driven members operatively connected to said shafts respectively and rotatable at different rates during the initial driving connection between said shafts, said clutch being operable upon approximate synchronization of the rotative speeds of said clutch members for effecting a change in the ratio of the driving connection between said shafts, braking means cooperable with the faster rotating of said clutch members for expediting the synchronization of the rotative speed thereof with that of the slower rotating of said clutch members, and means for actuating said braking means.

3. In an engine-driven vehicle provided with a source of vacuum, a change speed gearing having driving and driven shafts, a main clutch operatively connecting said driving shaft to the engine, a centrifugally actuated clutch having driving and driven members operatively connected to said driving and driven shafts respectively, and rotatable at different rates during an initial driving connection between said shafts, said centrifugal clutch being operable upon approximate synchronization of said members for effecting a change in the ratio of the driving connection between said shafts, vacuum-operated means for operating said main clutch to break the driving connection between said driving shaft and the engine, brake means for braking the driving member on said centrifugal clutch to expedite synchronization of said clutch members, vacuum-operated means for operating said brake means, a valve controlled by the throttle governing the speed of the engine for placing said main clutch vacuum-operated means in communication with said vacuum source for operating said main clutch, and a valve controlled by the operation of said main clutch for effecting communication between said brake vacuum-operated means and said vacuum source for effecting a braking of the driving member of said centrifugal clutch.

4. In a device of the class described, the combination of a positive driving clutch element and a centrifugal clutch driving element rotatable therewith, a driven shaft adapted to be connected to said clutch element to be driven thereby, a driven clutch member operatively connected to said driven shaft and having a positive driven clutch element selectively engageable with said positive driving clutch element and a centrifugal clutch driven element automatically engageable with said centrifugal clutch driving element and operable responsive to centrifugal force resulting from rotation of said driven shaft, means affording an initial driving connection between said centrifugal clutch elements whereby said driven element thereof is free to rotate faster than said centrifugal clutch driving element, means for preventing the operation of said centrifugal clutch driven element until the speed of rotation thereof is approximately synchronous with that of said centrifugal clutch driving element, a brake operable incidental to deceleration of said driving shaft and cooperative with said centrifugal clutch driving element for expediting the synchronization of the rotative speed thereof with that of said centrifugal clutch driven element to effect an automatic change in the ratio of the driving connection between said shafts, means carried by said driven clutch member and cooperable with said centrifugal clutch driving element for synchronizing the rotative speeds of said positive driving and driven clutch elements, and manually operable means for shifting said driven clutch member to connect said positive driving and driven clutch elements for effecting a selective change in the driving connection between said shafts.

5. In an automatic transmission having driving and driven shafts and automatic speed changing mechanism operatively connected to said shafts and operable for changing the ratio of the driving connection therebetween, said automatic speed changing mechanism including means affording an initial driving connection between said shafts for driving the driven shaft, an automatic clutch having an element operatively connected to each of said shafts and rotatable at relatively different rates at such time as said initial driving connection is provided between said shafts, said automatic clutch being operable upon approximate synchronization of the speeds of the elements thereof for providing a driving connection at a different ratio and around said initial driving connection, and braking means cooperable with the faster rotating of said elements for decelerating the same relative to the other of said elements to expedite the synchronization thereof.

6. In a device of the class described, the combination of driving and driven shafts with means affording an initial driving connection between said shafts, an automatic clutch operatively associated with said shafts and operable for providing a driving connection between said shafts at a ratio different than that provided by said initial driving connection, said automatic clutch including a member operatively associated with the driving shaft, a driven member, a shiftable clutching sleeve operable for connecting said driven member to the driven shaft, cooperable clutch teeth on the driving member and on said clutching sleeve operable for providing a locked-up driving connection around said automatic clutch, a synchronizing ring carried by said clutching sleeve and cooperable with said driving member for synchronizing the rotative speeds of the same before coupling said cooperable clutch teeth on the driving member and on said clutching sleeve, and means operable for shifting said clutching sleeve.

7. In a device of the class described, the combination of a change speed transmission having driving and driven shafts and a centrifugally actuated clutch including driving and driven members operatively connected to said shafts respectively and rotatable at different rates during the initial driving connection between said shafts, said clutch being operable upon synchronization of the rotative speeds of said clutch members for effecting a change in the ratio of the driving connection between said shafts, braking means cooperable with the faster rotating of said clutch members for expediting the synchronization thereof with that of the slower rotating of said clutch members, and means operable for actuating said braking means incidental to disconnecting said driving shaft from its source of power.

8. In a transmission mechanism having driving and driven shafts, a clutch element rotatable with one of said shafts, a shiftable clutch element rotatable with the other of said shafts and cooperable with said first named clutch element to connect said shafts, means providing an initial driving connection between said shafts for rotating the same initially at different rates, and vacuum operated means for decelerating the faster rotating of said clutch elements relative to the other of said clutch elements.

9. In a transmission mechanism having driving and driven shafts, the combination of a positive clutch element rotatable with each of said shafts and adapted to be connected for providing a driving connection between said shafts, means providing an initial driving connection between said shafts for initially rotating said clutch elements at different rates, and vacuum operated means for decelerating the speed of the faster rotating of said elements relative to that of the slower rotating of said elements.

10. In an engine driven vehicle, the combination of a variable speed transmission having driving and driven shafts and an automatic speed changing mechanism including an automatic clutch having driving and driven members operatively associated with said shafts respectively, means for providing an initial driving connection between said shafts during which time said clutch members will rotate at different rates of speed, and means operable for preventing the operation of said automatic clutch until the rotative speeds of said clutch members are approximately synchronous, a main clutch operatively connecting said driving shaft to the engine of said vehicle, and brake means operable for braking the faster rotating member of said automatic clutch to facilitate the synchronization of said clutch members, said braking means being operable incidental to the actuation of said main clutch.

11. In an engine driven vehicle, a change speed gearing having driving and driven shafts, a main clutch operatively connecting said driving shaft to the engine, an automatic clutch having driving and driven members operatively associated with said driving and driven shafts respectively, and rotatable at relatively different rates during the time an initial driving connection is provided between said shafts, said automatic clutch being operable upon approximate synchronization of said members for effecting a change in the ratio of the driving connection between said shafts, means for operating said main clutch to break the driving connection between said driving shaft and the engine, brake means operable for braking the faster rotating member of said automatic clutch to expedite the synchronization of said clutch members, and means controlled by the operation of said main clutch for controlling the operation of said brake means.

12. In a device of the class described, the combination of a positive driving clutch element and an automatic clutch driving element rotatable therewith, a driven shaft adapted to be connected to said clutch element to be driven thereby, a driven clutch member operatively connected to said driven shaft and having a positive driven clutch element selectively engageable with said positive driving clutch element, and an automatic clutch driven element automatically engageable with said automatic clutch driving element, means affording an initial driving connection between said shafts for rotating said clutch elements initially at different rates, means for preventing the operation of said automatic clutch until the rotative speeds of said clutch elements are approximately synchronous, brake means associated with said driven clutch member and cooperable with said automatic clutch driving element to expedite the synchronization of the rotative speeds of said positive driving and driven clutch elements, and means operable for shifting said driven clutch members to connect said positive driving and driven clutch elements for effecting a selective change in the driving connection between said shafts.

REX E. KELLER.